United States Patent
Schick

(10) Patent No.: US 10,273,193 B1
(45) Date of Patent: Apr. 30, 2019

(54) HORTICULTURE GROWTH MEDIA

(71) Applicant: Evan James Schick, Englewood, CO (US)

(72) Inventor: Evan James Schick, Englewood, CO (US)

( * ) Notice: Subject to any disclaimer, the term of this patent is extended or adjusted under 35 U.S.C. 154(b) by 407 days.

(21) Appl. No.: 14/869,951

(22) Filed: Sep. 29, 2015

(51) Int. Cl.
| | |
|---|---|
| *C05B 17/00* | (2006.01) |
| *A01G 1/00* | (2006.01) |
| *A01G 9/10* | (2006.01) |
| *A01G 22/00* | (2018.01) |
| *A01G 9/029* | (2018.01) |

(52) U.S. Cl.
CPC .............. *C05B 17/00* (2013.01); *A01G 1/001* (2013.01); *A01G 9/029* (2018.02); *A01G 9/10* (2013.01); *A01G 22/00* (2018.02)

(58) Field of Classification Search
CPC ............ C05B 17/00; A01G 9/10; A01G 1/001
See application file for complete search history.

(56) References Cited

U.S. PATENT DOCUMENTS

2015/0237807 A1* 8/2015 Valiquette .............. A01G 1/001
47/66.7
2016/0108096 A1* 4/2016 Thompson ........... A23K 20/147
800/278

FOREIGN PATENT DOCUMENTS

CA       2834540 A1 *  5/2015  ............. C05B 17/00

\* cited by examiner

*Primary Examiner* — Jennifer A Smith
(74) *Attorney, Agent, or Firm* — Ian C. Schick

(57) ABSTRACT

A horticulture growth medium includes a base organic soil, a soft rock phosphate component, a limestone component, a hydrated magnesium sulfate salt, volcanic dust comprising trace mineral nutrients, one or more humic acids, a shell source of calcium, a bone or blood meal component selected from fish bone meal, blood meal, steamed bone meal, and/or combinations thereof, bat guano, and worm castings. A method of growing a plant using the horticulture growth medium of includes planting a plant with the horticulture growth medium and providing periodic water to the plant, the horticulture growth medium being sufficient for plant growth during a complete cycle without the use of additional fertilizing agents. A kit includes the horticulture growth medium along with instructions for using the horticulture growth medium to grow plants.

12 Claims, No Drawings

HORTICULTURE GROWTH MEDIA

BACKGROUND

The present disclosure relates to growth media for plants. In particular, the present disclosure provides horticulture growth media that obviate the need for fertilizer supplementation.

Soils are frequently supplemented with fertilizers over the life cycle of a plant. There is an inherent difficulty in titering in an appropriate amount of chemical fertilizer to avoid stressing the plant due to too little or too much fertilizer. The stress placed on the plant can cause suboptimal growth, decrease the plant's inherent resistance to pests and pathogens, and ultimately produce an inferior plant product. These stresses can also prevent the natural genetic capacity of the plant to provide products having aesthetic appearance and/or taste and/or smell in connection with human or animal consumption. The present disclosure addresses these concerns by providing horticulture growth media that obviate the need for fertilizer supplementation, allowing plants to thrive absent the aforementioned stresses.

SUMMARY

In some aspects, there is provided a horticulture growth medium comprising a base organic soil, a soft rock phosphate component, a limestone component, a hydrated magnesium sulfate salt, volcanic dust comprising trace mineral nutrients, one or more humic acids, a shell source of calcium, a bone or blood meal component selected from fish bone meal, blood meal, steamed bone meal, and/or combinations thereof, bat guano, and worm castings.

In other aspects, there is provided a method of growing a plant using the horticulture growth medium herein. The method includes planting a plant with the horticulture growth medium and providing periodic water to the plant. The horticulture growth medium is sufficient for plant growth during a complete cycle without the use of additional fertilizing agents.

In still further aspects, there is provided a kit comprising the horticulture growth medium along with instructions for using the horticulture growth medium to grow plants.

DETAILED DESCRIPTION

Implementations herein provide horticulture growth media comprising a base organic soil; a soft rock phosphate component (e.g., CALPHOS™); a limestone component; a hydrated magnesium sulfate salt (e.g., Epsom salt); one or more humic acids; a shell source of calcium; a bone or blood meal component selected from the group consisting of fish bone meal, blood bone meal, steamed bone meal, and combinations thereof; bat guano; volcanic dust comprising trace mineral nutrients; and worm castings.

The horticulture growth media disclosed herein may be readily prepared by simply mixing all the ingredients in a one-pot procedure. The media may be easy to use and may provide a sufficient source of nutrient ingredients to sustain plant growth through an entire growth cycle, such as about 8 to 12 weeks, although depending on the plant, this could be longer or shorter. Use of the horticulture growth media allows the user to avoid the use of fertilizer altogether. This can be advantageous to avoid stressing and/or shocking the plant. For example, use of the horticulture growth media avoids the difficulty associated with administering the precise amount of fertilizer that individual plants may require, thereby avoiding stresses due to too little or not enough fertilizer. Such stresses can divert energy from healthy growth and can reduce a plant's innate ability to fend of pests or pathogens. The horticulture growth media can therefore be used as a means to reduce chemical loads of pesticides and harsh chemical fertilizers, and to allow the plant to naturally achieve its genetic potential.

Moreover, the horticulture growth media disclosed herein may enhance and/or provide unique characteristics to the plant. This may take the form of overall look of the plant, and/or the taste and/or smell of the plant if eaten, smoked, or otherwise consumed in some manner. These and other advantages will be evident to those skilled in the art.

As used herein, "a base organic soil" refers to any potting soil, topsoil, flower bed mix, and the like designed from natural organic ingredients. Such organic base soils are exemplified by those commercially available from Miller Companies, LC (Hymn, Utah). Examples of organic ingredients in organic base soils may include one or more of coconut coir, peat moss, perlite, pumice, compost, biochar, worm castings, soybean meal, kelp meal, CALPHOS™, gypsum, dolomite, iron (II) sulfate, bat guano, glacial rock dust, endo/ecto mycorrhizae, yucca extract, sphagnum moss, black peat, steer manure, composted forest products, expanded shale aggregate, alfalfa meal, greensand, and/or other organic-based soil ingredients. In some implementations, the base organic soil may be readily draining, non-compacting, nutrient containing (not inert), coir-based soil, in contrast to, for example, a peat-based soil.

In some implementations, the base organic soil has a total nitrogen content in a range from about 0.1 percent to about 1.0 percent based on a dry matter basis of the base organic soil, or in a range from about 0.25 to about 0.75, or in a range from about 0.30 to about 0.60, including any subrange in between, based on a dry matter basis of the base organic soil. In some implementations, the base organic soil has a total nitrogen content percent based on a dry matter basis of about 0.1, 0.2, 0.3, 0.4, 0.5, 0.6, 0.7, 0.8, 0.9, or 1.0, including any value in between.

In some implementations, the base organic soil has a carbon-to-nitrogen ratio (C/N) in a range from about 40 (i.e., 40:1) to about 60 (i.e., 60:1) based on a dry matter basis of the base organic soil. In some implementations, the C/N ratio may be in a range from about 40 to about 50. In some implementations the ratio may be 40, 41, 42, 43, 44, 45, 46, 47, 48, 49, 50, 51, 52, 53, 54, 55, 56, 57, 58, 59, or 60, including any fraction thereof.

As used herein, "soft rock phosphate" refers to colloidal phosphate naturally occurring as a clay material that can be found in settling basins of former hard phosphate rock mining operations. It contains about 20 percent P2O5 and more than about 25 percent lime and other trace minerals. Unlike synthetic phosphates, soft rock phosphate is insoluble in water, does not leach, and is long-lasting. Soft rock phosphate can be obtained commercially as CALPHOS™ (Canton Mills, Inc., Minnesota City, Minn.). In some implementations, the soft rock phosphate component may be present in a range from about 20 grams to about 50 grams per cubic feet of the base organic soil. In some implementations, the soft rock phosphate may be present in a range from about 20 grams to about 40 grams per cubic feet of the base organic soil. In some implementations, the soft rock phosphate may be provided in an amount of about 20, 25, 30, 35, 40, 45, or about 50 grams per cubic feet of the base organic soil, including any value in between and fractions thereof.

In some implementations, the horticulture growth media comprises limestone. Limestone may include products referred to as agricultural lime, aglime, Biolime, agricultural limestone, garden lime or liming. Limestone is a soil additive typically sourced from pulverized limestone or chalk. Limestone provides a source of calcium carbonate and may comprise other chemicals depending on the mineral source. Examples of other chemicals may include one or more of calcium oxide, magnesium oxide, magnesium carbonate, and/or other chemicals. Limestone may be used to (1) increase the pH of acidic soil; (2) provide a source of calcium and magnesium; and (3) improve water penetration and the uptake of major plant nutrients (nitrogen, phosphorus, and potassium). In some implementations, the limestone component may be present in a range from about 20 grams to about 50 grams per cubic feet of the base organic soil. In some implementations, the limestone may be present in a range from about 25 grams to about 45 grams cubic feet of base organic soil. In some implementation the limestone may be present in an amount of about 20, 25, 30, 35, 40, 45 or about 50 grams per cubic feet of base organic soil, including values in between and fractions thereof.

In some implementations, the horticulture growth media includes magnesium sulfate in hydrate form, such as the heptahydrate, commonly available as Epsom salt. In some implementations, the hydrated magnesium sulfate salt is present in a range from about 10 grams to about 30 grams per cubic feet of the base organic soil. In some implementations, the hydrated magnesium sulfate salt may be present in a range from about 15 grams to about 25 grams per cubic feet of the base organic soil. In some implementations the hydrated magnesium sulfate may be present in an amount of about 10, 15, 20, 25, or about 30 grams per cubic of the base organic soil, including values in between and fractions thereof.

Humic substances may be included in the horticulture growth media disclosed herein as one or more humic acids. Such compounds are formed, for example, as a byproduct of the microbial degradation of dead plant matter, such as lignin. Humic acids tend to be resistant to further biodegradation. The precise properties and structure of a given sample depends on, inter alia, the water or soil source and the specific conditions of extraction. However, on average, the properties of humic acids from different sources are remarkably similar. Humic substances in soils and sediments can be divided into three main fractions: humic acids, fulvic acids, and humin, all of which are contemplated within implementations of the growth media herein. In some implementations, the one or more humic acids are provided in granular form and are derived from Leonardite which is commercially available from Down to Earth (Eugene, Oreg.). In some implementations, the one or more humic acids may be present in a range from about 10 grams to about 30 grams per cubic feet of the base organic potting soil. In some implementations, the one or more humic acids are present in a range from about 15 grams to about 25 grams per cubic feet of the base organic soil. In some implementations, the one or more humic acids are present in an amount of about 10, 15, 20, 25, or about 30 grams per cubic of the base organic soil, including values in between and fractions thereof.

In some implementations, the horticulture growth media comprise a shell source of calcium. In some implementations, this may be provided in the form of oyster shells, crab shells, shrimp shells, or a combination thereof. In some implementations, other organic calcium sources include, without limitation, egg shells, clam shells, and gypsum. In some implementations, the shell source of calcium may be oyster shells which is commercially available from Down to Earth (Eugene, Oreg.). In some implementations, the shell source of calcium may be present in a range from about 20 grams to about 50 grams per cubic feet of the base organic soil. In some implementations, the shell source of calcium may be present in a range from about 30 grams to about 50 grams per cubic feet of the base organic soil. In some implementations, the shell source of calcium may be present in an amount of about 20, 25, 30, 35, 40, 45, or about 50 grams per cubic feet of the base organic soil, including any value in between and fractions thereof.

In some implementations, the horticulture growth media includes one or more sources of bone and/or blood meal. Bone meal is made from steamed and crushed animal bones and is rich in phosphorous, a mineral that plants need for healthy root development and flower growth. It also contains calcium and nitrogen, both of which are beneficial to plants. Blood meal is a by-product of animal processing and provides a rich source of nitrogen. In some implementations, bone and blood meal may include fish bone meal, blood meal, or steamed bone meal. In some implementations, a total of bone and blood meal may be present in a range from about 50 grams to about 150 grams per cubic feet of the base organic soil. The various meal sources may include from about 20 grams to about 50 grams of fish bone meal, from about 50 grams to about 100 grams of steamed bone meal, and/or from about 50 grams to about 150 grams of blood meal per cubic feet of base organic soil. In implementations, fish bone meal may be present in an amount of about 20, 25, 30, 35, 40, 45, or 50 grams per cubic feet of base organic soil, including all values in between and fractions thereof. In some implementations, the steamed bone meal may be present in an amount of about 50, 55, 60, 65, 70, 75, 80, 85, 90, 95, or about 100 grams per cubic feet of base organic soil, including all values in between and fractions thereof.

In some implementations, the horticulture growth media comprise bat guano. In some such implementations, the bat guano may be Indonesian bat guano (0-7-0) available from Sunleaves Garden Products (Bloomington, Ind.). Such products provide high dosages of phosphorous. In some implementations, other guano products may be employed such as Sea Bird Guano, bat guano sourced elsewhere, such as Peruvian, or Jamaican bat guano. Any of these guano sources may be used in combination. In some implementations, the bat guano may be present in a range from about 50 grams to about 150 grams per cubic feet of the base organic soil. In some implementations, the bat guano may be present in a range from about 90 grams to about 130 grams per cubic feet of the base organic soil. In implementations, the bat guano may be present in an amount of about 50, 60, 70, 80, 90, 100, 110, 120, 130, 140, or about 150 grams per cubic feet of base organic soil, including all values in between and fractions thereof.

In implementations, the horticulture growth media may further comprise worm castings, such as big worm castings. In some implementations, the worm castings are present in a range from about 0.5 cubic feet to about 4 cubic feet of castings per 36 cubic feet base soil, or about 1 to 3 cubic feet of castings per 36 cubic feet of base soil. In some implementatings the amount of castings may be 0.5, 1.0, 1.5, 2.0, 2.5, 3.0, 3.5, or about 4 cubic feet per 36 cubic feet of base soil, including quantities in between and fractions thereof.

In some implementations, the horticulture growth media further comprise trace mineral nutrients, such as those found in volcanic dust. AZOMITE™ is a commercial source of such a product available from Down to Earth (Eugene, Oreg.). Such products may be present in an amount ranging from about 10 grams to about 30 grams per cubic feet of base organic soil. In some implementations, the volcanic dust may be present in a range from about 15 grams to about 25 grams per cubic feet of the base organic soil. In some implementations, the volcanic dust may be present in an amount of about 10, 15, 20, 25, or about 30 grams per cubic of the base organic soil, including values in between and fractions thereof.

In some implementations, there are provided methods of growing a plant using the horticulture growth media disclosed herein, the method comprising planting a plant with the horticulture growth media and providing periodic water to the plant, wherein the horticulture growth media may be sufficient for plant growth during a complete cycle without the use of additional fertilizing agents. In some such implementations, the plant may be potted.

The methods disclosed herein require only watering of the plant after planting during the growth cycle. No fertilizer needs to be added during the growth cycle, as all the requisite nutrients are present in the horticulture growth media. In some implementations, the complete cycle may be in a range from about 8 weeks to about 12 weeks. In some implementations, vegetative (i.e., no induction of flowering cycle) stock plants may be grown with the media disclosed herein over periods from about six to about twelve months while undergoing heavy pruning. Flowering and fruiting plants may be sustained for one growing cycle such as one summer in a raised bed garden or containerized garden. Longer periods of effectiveness may be achieved, including about 12, 24, or 36 months.

The methods provide plant products with a superior look, and if edible and/or smokeable, superior taste. The methods herein may provide products with superior smell, vastly increased terpene profile, with quality plant structure, including, without limitation stronger stems and branches thus providing to less breakage. Where the plant can be smoked, the character of the smoke may be more smooth on the throat and without chemical after tastes. Where the plant bears fruits, such fruits may be more sweet and flower colors brighter. Still further, the methods herein help realize the full expression of genetic character of each strain/variety without the forced growth effects of misapplied liquid/mineral based nutriments.

In some implementations, the plant may be a flowering plant. Examples of flowering plants may include one or more of the genus *Petunia*, including a *petunia* (*Petunia hybrida* Vilm.); the genus *Pelargonium*, a geranium (*Petargonium zonale, Pelargonium inquinans, Pelargonium hortorum*, including hybrids thereof), a *pelargonium* (*Pelargonium cucullatum, Pelargonium grandiflorum, Pelargonium angulosum, Petargonium domesticum*, including hybrids thereof), an Ivy geranium (*Pelargonium peltatum, Pelargonium lateripes*, including hybrids thereof) and a scented leaved geranium (*Pelargonium graveolens, Pelargonium radula, Pelargonium odoratissimum, Pelargonium quercifolium*, including hybrids thereof); the genus *cannabis* and the genus *Euphorbia*, a poinsettia (*Euphorbia pulcherrima* Willd.) and a *euphorbia* (*Euphorbia marginata* Pursh), and/or any other flowering plants. In some implementations, the plant may be a flowering plant of the genus *Cannabis*, including the species *Cannabis sativa, Cannabis indica*, and *Cannabis ruderalis*. The media disclosed herein can be used with any flowering plants grown for flower or fruit. The media are particularly well-suited for annual flowers/fruits/vegetables and perennial vegetative, non-flowering plants.

In some implementations, the plant may be an annual herbaceous plant. In some implementations, the plants may be food plants grown as annuals including domesticated grains. In some implementations, the annuals may be perennials and biennials grown in gardens as annuals. Examples of such plants may include one or more of carrots, celery and parsley, tomatoes, sweet potatoes, bell peppers, and/or other similar plants. The plants may also be ornamental perennials grown as annuals such as impatiens, wax begonias, snapdragons, Pelargoniums, coleuses and petunias. Examples of plant annuals may include one or more of corn, wheat, rice, lettuce, peas, watermelons, beans, zinnias and marigolds, and/or other plant annuals. In some implementations plants may be of any variety that would be planted in a vegetable garden or bedding flowers. In some implementations, the media may be useful for establishing new fruit trees and sustaining growth for the first year. The media disclosed herein may be particularly suitable for fast growing and high nutrient consuming plants.

In some implementations, there are provided kits comprising the horticulture growth media described herein along with instructions for using the horticulture growth media to grow plants. In some implementations, the ingredients of the horticulture growth media are pre-mixed and ready to use in the kit. In other implementations, any portion of the horticulture growth media may be separately packaged for mixing upon use. In some implementations, the kit further comprises seeds of a plant.

The following Examples are provided to illustrate implementations of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

This example describes an exemplary base soil.

Table 1 below summarizes the contents of an exemplary base organic soil in accordance with implementations herein.

TABLE 1

| Parameter | As Received Basis | lbs/ton | Dry Matter Basis | lbs/ton | Method* |
|---|---|---|---|---|---|
| Total Solids (%) | 67.1 | | 100 | | 03.09-A |
| Moisture (%) | 32.9 | | 0 | | 03.09-A |
| Organic Matter (%) | 24.4 | | 36.4 | | 05.07-A |
| Ash (%) | 42.7 | | 63.6 | | 05.07-A |
| Soluble Salts (1:5, mmhos/cm) | 1.2 | | | | 04-10-A |

TABLE 1-continued

| Parameter | As Received Basis | lbs/ton | Dry Matter Basis | lbs/ton | Method* |
|---|---|---|---|---|---|
| Soluble salts (paste, mmhos/cm) | 2.2 | | | | |
| pH 1:5 | 5.8 | | | | 04-11-A |
| pH (paste) | 5.6 | | | | |
| Total Nitrogen (%) | 0.3322 | 6.6 | 0.495 | 9.9 | 04.02-D |
| Organic Nitrogen (%) | 0.2848 | 5.7 | 0.424 | 8.5 | Calc |
| Ammonium-Nitrogen (%) | 0.0251 | | 0.0374 | | 04.02-C |
| Ammonium-Nitrogen (ppm) | 251.0 | | 374.1 | | 04.02-C |
| Nitrate-Nitrogen (%) | 0.0223 | | 0.0332 | | 04.02-B |
| Nitrate-Nitrogen (ppm) | 222.8 | | 332.0 | | 04.02-B |
| Total Phosphorus as P (%) | 0.3440 | 6.9 | 0.513 | 10.3 | 04.03-A |
| Total Phosphorus as P2O5 (%) | 0.7878 | 15.8 | 1.174 | 23.5 | 04.03-A |
| Total Potassium as K (%) | 0.3211 | 6.4 | 0.4785 | 9.6 | 04.04-A |
| Total Potassium as K2O (%) | 0.3853 | 7.7 | 0.5742 | 11.5 | 04.04-A |
| C/N ratio | 46.2 | | 46.2 | | Calc |
| Ammonium-N/Nitrate-N Ratio | 1.13 | | 1.13 | | Calc |
| Lime (% calcium carbonate) | 0.3 | | 0.45 | | 6E1c** |
| Sodium Adsorption Ratio (SAR) | 1.7 | | 1.7 | | 10-3.4*** |
| Plant available phosphorus (ppm) | 176 | | 262 | | AB-DTPA |
| Plant available potassium (ppm) | 2002 | | 2984 | | AB-DTPA |
| Plant available zinc (ppm) | 13.6 | | 20.3 | | AB-DTPA |
| Plant available iron (ppm) | 182.8 | | 272.4 | | AB-DTPA |
| Plant available manganese (ppm) | 55.0 | | 82.0 | | AB-DTPA |
| Plant available copper (ppm) | 6.1 | | 9.1 | | AB-DTPA |
| total zinc (ppm) | 57.9 | | 86.3 | | 3050/6010 |
| total iron (ppm) | 5516 | | 8221 | | 3050/6010 |
| total manganese (ppm) | 168.5 | | 251 | | 3050/6010 |
| total copper (ppm) | 15.3 | | 22.8 | | 3050/6010 |

*Unless otherwise noted, methods are from "Test Methods for The Examination of Composting and Compost. 2001, W. H. Thompson (ed), which is incorporated herein by reference in its entirety
**From Soil Survey Laboratory Methods Manual, Soil Survey Investigations Report, No. 2, Version 3, 1996
***Methods of Soil Analysis. A. L. Page (ed), ASA, 1982 AB-DTPA is ammonium Bicarbonate-DTPA"

Example 2

This example describes exemplary horticulture growth media in accordance with implementations here.

The following ingredients were mixed together to generate Formulation A. The notation (#-#-#) indicates the nitrogen, phosphorous, and potassium content, respectively. This is commonly referred to as the NPK ratio. This NPK ratio reflects the available nutrients by weight contained in an additive.

(1) 400 g CALPHOS™ (0-3-0), available from Homestead Organics: Available Phosphate 3%, 20% total Phosphate, 17% insoluble phosphate, Calcium 20%;

(2) 400 g Limestone, available as commercial product Spartan's speed grow: CaCO3 75%, MgCO3 12%, Ca 30%, Mg 3%;

(3) 400 g Oyster Shell available from Down to Earth: Ca 35%;

(4) 400 g Fish Bone Meal (3-16-0), available from Down to Earth: N 3%, Available Phosphate 16%, Ca 14%;

(5) 1120 g Blood Meal (12-0-0), available from Down to Earth: N 12%, 1% water soluble N, 11% water insoluble N;

(6) 1120 g Indonesian Bat Guano (0-7-0), available from Sunleaves: Available Phosphate 7%;

(7) 720 g Steamed Bone Meal (3-15-0), available from Happy Frog: N 3%, P2O5 15%, Ca 18%;

(8) 100 g Epsom Salt, available from Simply Right Health Care: Magnesium Sulfate 100% as hydrate;

(9) 100 g Azomite (0-0-0.2) available from Down to Earth: Soluble Potash 0.02%, Ca 1.8%, Mg 0.5%, Cl 0.1%, Na 0.1%;

(10) 100 g Granular Humic Acids available from Down to Earth: Humic Acids Derived from Leonardite 50%, Inert ingredients 50%;

(11) Big worm worm castings available from Roots Organics ⅔ cubic foot; and

(12) Miller organic potting soil described in Example 1, 6 cubic feet.

The following ingredients were mixed together to generate Formulation B:

All of the ingredient of Formula A are used except the base organic potting soil is Roots Organics Original Potting Soil (Aurora Innovations, Eugene, Oreg.).

What is claimed is:

1. A horticulture growth medium providing a sufficient source of nutrient ingredients to sustain plant growth through an entire growth cycle of 8 to 12 weeks so as to avoid chemical fertilizers during the growth cycle of a plant thereby avoiding stressing and/or shocking the plant, the horticultural growth medium comprising:
- a base organic soil;
- a soft rock phosphate component, wherein the soft rock phosphate component is present in a range from about 20 grams to about 50 grams per cubic feet of the base organic soil;
- a limestone component, wherein the limestone component is present in a range from about 20 grams to about 50 grams per cubic feet of the base organic soil;
- a hydrated magnesium sulfate salt, wherein the hydrated magnesium sulfate salt is present in a range from about 10 grams to about 30 grams per cubic feet of the base organic soil;
- volcanic dust comprising trace mineral nutrients;
- one or more humic acids, wherein the one or more humic acids is present in a range from about 10 grams to about 30 grams per cubic feet of the base organic soil;
- a shell source of calcium, wherein the shell source of calcium is present in a range from about 20 grams to about 50 grams per cubic feet of the base organic soil;
- a bone or blood meal component selected from the group consisting of fish bone meal, blood meal, steamed bone meal, and/or combinations thereof, wherein a total bone or blood meal is present in a range from about 50 grams to about 150 grams per cubic feet of the base organic soil;
- bat guano, wherein the bat guano is present in a range from about 50 grams to about 150 grams per cubic feet of the base organic soil; and
- worm castings, wherein the worm castings are present in a range from about 0.5 to about 4 cubic feet per 36 cubic feet of the base organic soil.

2. The horticulture growth medium of claim 1, wherein the base organic soil has a total nitrogen content in a range from about 0.1 percent to about 1.0 percent based on a dry matter basis of the base organic soil.

3. The horticulture growth medium of claim 1, wherein the base organic soil has a carbon-to-nitrogen ratio (C/N) in a range from about 40 to about 60 based on a dry matter basis of the base organic soil.

4. A method of growing a plant using the horticulture growth medium of claim 1 comprising:
- planting a plant with the horticulture growth medium; and
- providing periodic water to the plant;
    - wherein the horticulture growth medium is sufficient for plant growth during a complete cycle without the use of additional fertilizing agents.

5. The method of claim 4, wherein the plant is potted.

6. The method of claim 4, wherein the complete cycle is a range from about 8 weeks to about 12 weeks.

7. The method of claim 4, wherein the plant is a flowering plant.

8. The method of claim 4, wherein the plant is an annual herbaceous plant.

9. The method of claim 4, wherein the plant is of the genus *Cannabis*.

10. A kit comprising the horticulture growth medium of claim 1 along with instructions for using the horticulture growth medium to grow plants.

11. The kit of claim 10, wherein the ingredients of the horticulture growth medium are pre-mixed and ready to use.

12. The kit of claim 10, further comprising seeds of a plant.

* * * * *